W. G. TISSUE.
COLLAPSIBLE BARREL.
APPLICATION FILED APR. 29, 1913.
1,150,080.
Patented Aug. 17, 1915.
3 SHEETS—SHEET 1.
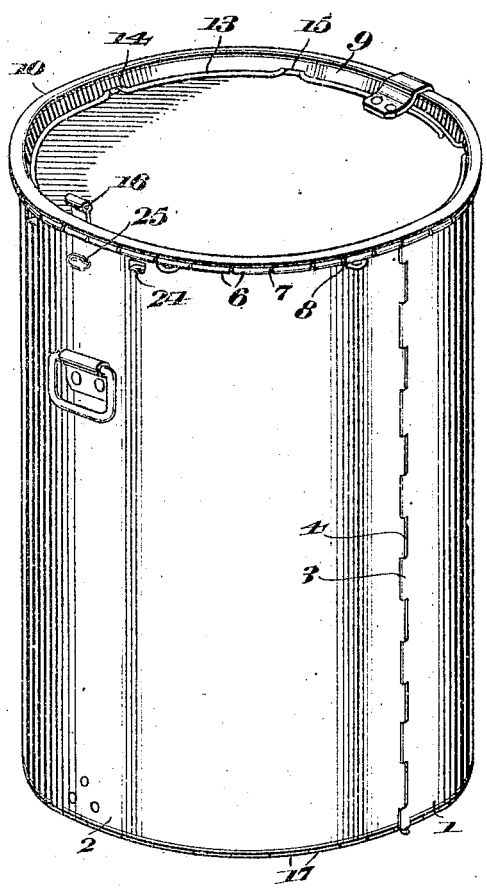
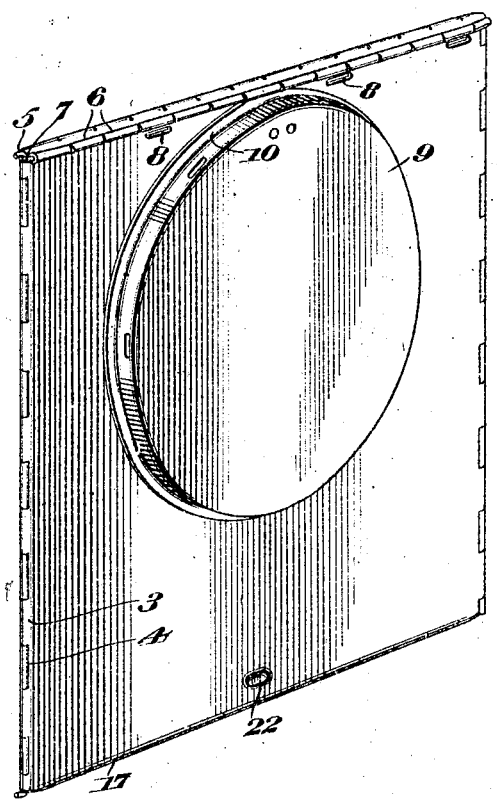
Inventor
Wilbert G. Tissue W. G. TISSUE.
COLLAPSIBLE BARREL.
APPLICATION FILED APR. 29, 1913.
1,150,080.
Patented Aug. 17, 1915.
3 SHEETS—SHEET 2.
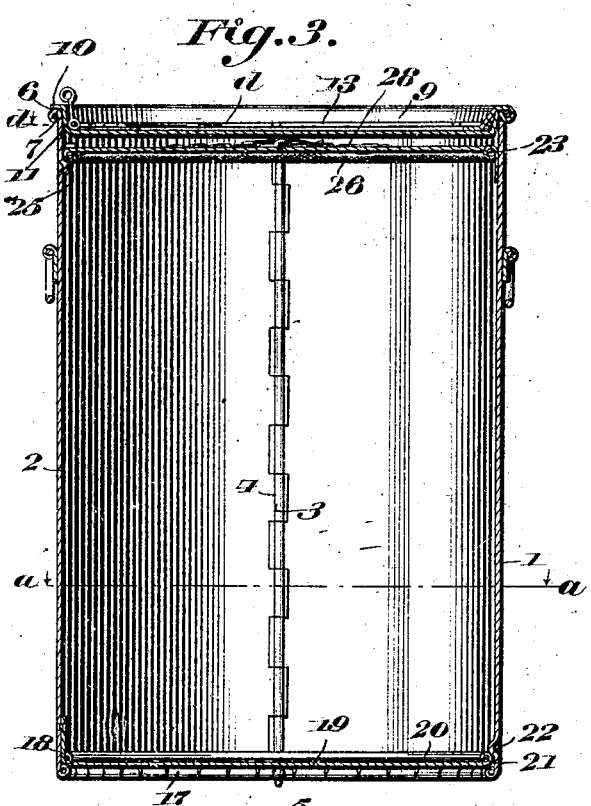
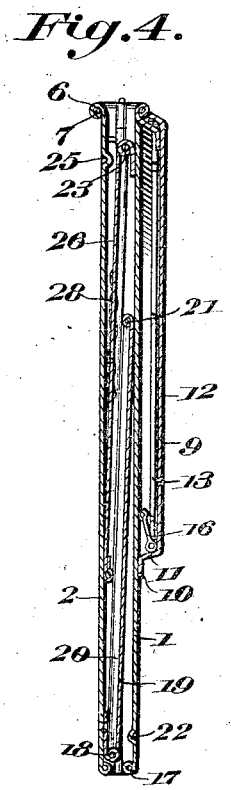
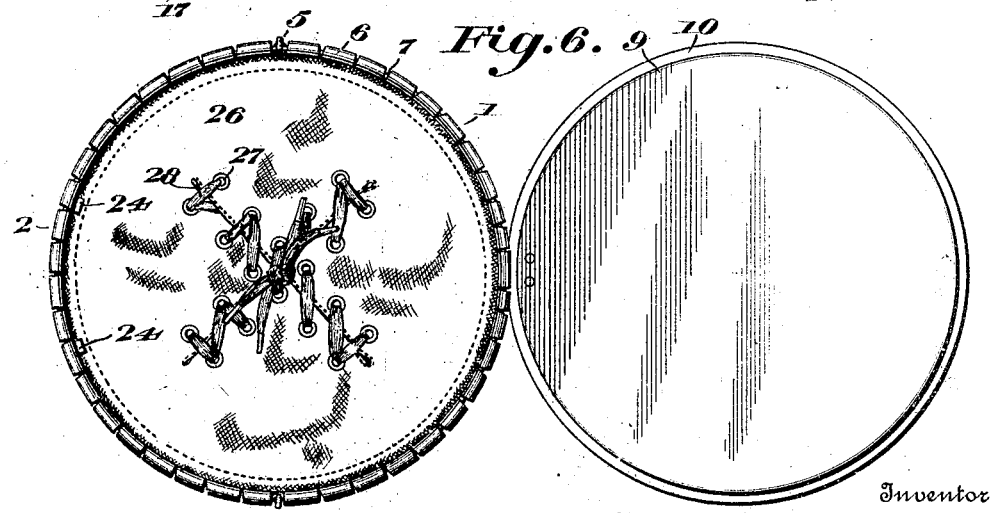
Witnesses
Inventor
Wilbert G. Tissue
By Victor J. Evans
Attorney W. G. TISSUE.
COLLAPSIBLE BARREL.
APPLICATION FILED APR. 29, 1913.
1,150,080.
Patented Aug. 17, 1915.
3 SHEETS—SHEET 3.
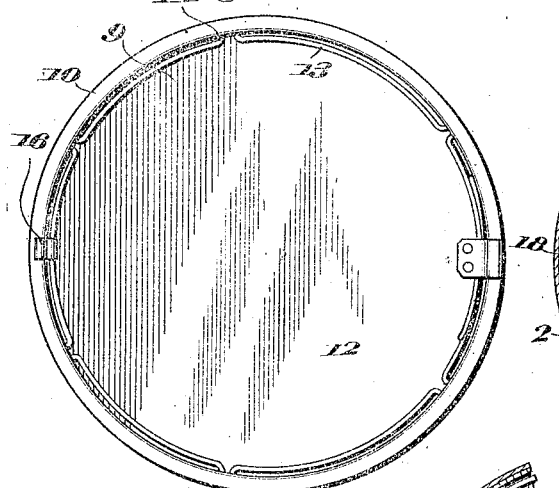
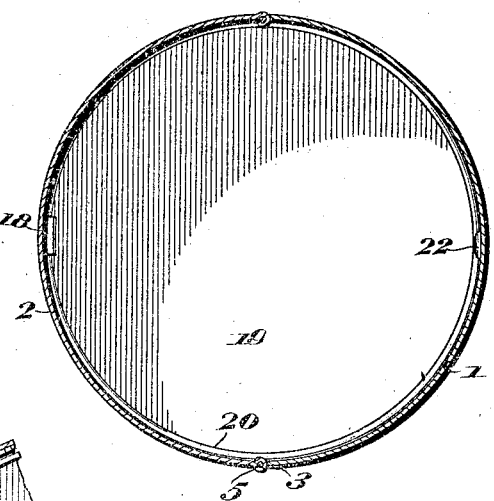
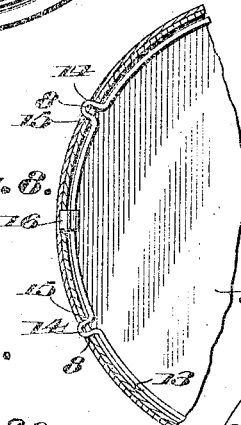
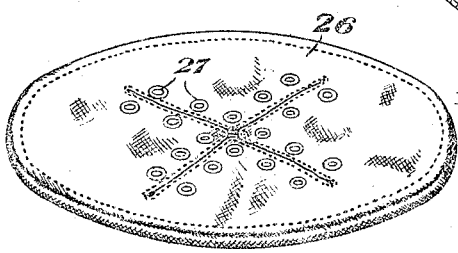
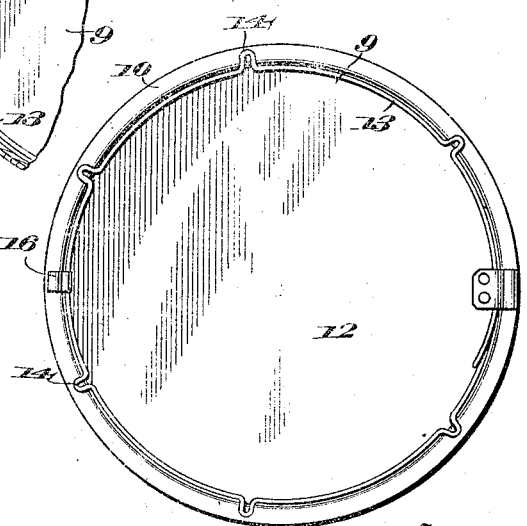
Inventor
Wilbert G. Tissue
By Victor J. Evans
Attorney
Witnesses

UNITED STATES PATENT OFFICE.

WILBERT GRANT TISSUE, OF MEYERSDALE, PENNSYLVANIA.

COLLAPSIBLE BARREL.

1,150,080.  Specification of Letters Patent.  Patented Aug. 17, 1915.

Application filed April 29, 1913. Serial No. 764,430.

*To all whom it may concern:*

Be it known that I, WILBERT GRANT TISSUE, a citizen of the United States, residing at Meyersdale, in the county of Somerset and State of Pennsylvania, have invented new and useful Improvements in Collapsible Barrels, of which the following is a specification.

The present invention relates to foldable or collapsible barrels, and resides in the construction, combination and arrangement of parts set forth in the following specification and falling within the scope of the appended claim.

In the drawings: Figure 1 is a perspective view of a barrel constructed in accordance with the present invention, the same being in its set up position, Fig. 2 is a similar view illustrating the barrel collapsed, Fig. 3 is a central vertical longitudinal sectional view taken through the device as illustrated in Fig. 1, Fig. 4 is a similar sectional view taken through the device as illustrated in Fig. 2, Fig. 5 is a top plan view of the barrel, the upper head being shown in locked position thereon, Fig. 6 is a similar view, the upper head being illustrated in its open position, Fig. 7 is a horizontal section on the line a—a of Fig. 3, Fig. 8 is a detail sectional view on the line d—d of Fig. 2, Fig. 9 is a detail perspective view of the textile or auxiliary top for the barrel, and Fig. 10 is a view looking toward the top of the barrel and illustrating the means for locking the top upon the barrel in an unlocking position.

My improved barrel has its body formed from two rectangular plates of thin resilient material, which are designated by the numerals 1 and 2 respectively. The plates 1 and 2 are normally adapted to assume their normal or natural flat position. The longitudinal or longer edges of the plates 1 and 2 are formed with alternating tongues 3 and spaces 4 arranged between the tongues. The tongues of each of the members 1 and 2 being rounded, provide what may be termed hinged knuckles, and the tongues of one of the members is adapted to be arranged within the space between two of the tongues of the second member of the barrel, and are adapted to receive a pivot member in the nature of a rod 5. The pivot rods may have their extremities bent over the upper and lower edges of the barrel or the ends of the said pivots may be provided with heads, and further, the said pivots may be removably secured to within the tongues in any desired or preferred manner. Again, it is not absolutely essential that the sections 1 and 2 have their opposite edges formed with tongues 3, as the said sections 1 and 2 may be otherwise hingedly connected together. The sections 1 and 2, at the upper edges of the body of the barrel formed by the said members are slitted at intervals, and the metal between the slits rounded outwardly and downwardly with relation to the said sections, to provide a plurality of spaced beads 6, and passing through the said beads is a flexible and resilient band 7, the said band being preferably formed from wire strands, or if desired, the said band may comprise a continuous coiled spring, or further, the said band may be constructed of any other elastic material. The members 1 and 2 at a suitable distance below the beads 6 are formed with transversely arranged elongated openings 8, and hingedly secured, central of the barrel 1, between two of the beads 6 and with the band 7, is a top or head 9. The head includes a round member having its upper portion formed with a continuous flange or rim 10, the said rim adapted to fully cover the upper portion of the barrel. The head 9 is dished from its rim 10 to provide a continuous depressed substantially inclined wall 11, and a flat surface 12. The wall 11 is adapted to engage with the inner faces of the barrel sections 1 and 2, to expand the said sections and to retain the body of the barrel in a cylindrical formation.

Arranged upon the upper face of the flat surface 12, at the juncture of the wall 11 therewith, is a locking element formed from a continuous strand of wire. The element has its ends secured to the opposite sides of the hinge of the head, and includes a continuous ring 13 which at spaced intervals is provided with outwardly projecting curved portions 14 which provide what may be termed engaging lips, and the wall 11 is provided with openings 15 through which these lips may project. The openings 15 are adapted to register with the openings 8 in the body of the barrel when the head 9 is swung to a closed position upon the barrel, and connected with the ring 13, at a point, approximately diametrically opposite the hinge of the head is a flat finger grip 16 which is loosely mounted upon the ring 13 and which is adapted to serve as a means, when an inward pressure is exerted thereon, to wholly or partially withdraw the lips 15 from their respective openings 15 while the inclined or flanged portion 11 of the head is being forced to within the barrel, and, when the said grip is released to permit of the said lips passing through the openings 15 and entering the openings 8, thus effectively locking the head upon the barrel and sustaining the normally flat sections 1 and 2 semi-circular or half round at the upper edge of the barrel.

The lower edge of the barrel has its sections 1 and 2 slitted at intervals, the said slitted portions being rolled inwardly to provide spaced beads 17. By slitting the edges of the plates upon which the beads are formed, and so providing each of the adjacent ends of the beads in angular relation, it will be noted that the sections 1 and 2 may be readily spread to semi-circular position without being interfered by the beads.

Hingedly connected, as at 18, and directly above the central bead 17 of the barrel section or plate 2, is the bottom or head member 19 of the barrel. This member is flat and provided with a rounded periphery, and of a size adapted to expand or curve the sections 1 and 2 to force the same into a cylindrical formation when the said member 19 has its edge frictionally contacted with the inner faces of the plates 1 and 2 above the beads 17. The bottom member 19 is peripherally formed with a continuous bead 20 within which is a reinforcing ring 21, the same adding to the rigidity of the bottom as well as reinforcing the beaded edge thereof, and the beaded periphery, when the bottom is closed within the barrel, is adapted to rest upon the spaced beads 17. The section 1, above its lower edge and beads 17, and approximately central of the said member 1, has an inturned or indented portion 22 which is adapted to engage with the upper surface of the rim or bead 20 of the bottom to frictionally contact therewith and to prevent the bottom from being accidentally swung inwardly of the barrel.

It is, of course, to be understood that a barrel constructed as above described, is to be used for containing or shipping dry measures, and when certain products are deposited within the barrel, it is desirable that the same be tightly packed so as to prevent the continuous rolling or displacement of the same which might have a tendency to injure the locking element at the head of the barrel, and so it is desirable to provide such an auxiliary head of fabric material which may be readily opened so that the contents of the barrel may be accessible and which also may be readily closed so that the contents of the barrel will not be unduly influenced by the atmosphere, and also whereby the head 9 may be swung to its open position without permitting of the collapsing or closing of the top of the barrel, as well as to prevent the contents of the barrel being tampered with. Therefore, at a suitable distance below the hinged connection of the top 9 with the barrel section 1, I hingedly connect to the said barrel a continuous ring 23, and I provide the section 2 of the barrel, below its beads 6 with substantially U-shaped slits, the metal thereof being bent inwardly to provide stops 24 with which the ring 23 contacts, when the said ring is swung upwardly of the barrel sections, and further, I provide the section 2 with inturned portions or indentations 25 which are disposed below the stops 24, and which are adapted to engage the lower surface of the ring to sustain the said ring properly upon the body of the barrel. To this ring 23 I secure a fabric 26, the same forming the body of what may be termed the auxiliary top for the barrel. This fabric is centrally slit at right angles, providing the edges of the said slitted portions with suitable bindings, and further provide the tongues arranged between the slits with eyelets 27, while I lace through the eyelets tapes or strings 28, the ends of said strings projecting through the eyelets adjacent the central portion of the fabric 26, and the said ends are adapted to be tied in the form of a knot so as to secure the tongues of the fabric but permitting of the loosening of the tapes, after the knots have been untied to permit of the contents being removed from the barrel without entirely unlacing the tapes.

From the above description, taken in connection with the accompanying drawings, it will be noted that I have provided a barrel, the sides of which owing to the nature of the material from which they are formed, will automatically spring to assume flat positions when the heads are swung against one of the sides, one in which said heads effectively retain the barrel in a set-up position and are secured against accidental displacement, one wherein a fabric top is provided so that access to the contents of the barrel may be easily and quickly obtained, and further, whereby the contents of the barrel are amply protected, and also wherein the barrel may be easily and quickly set up and when collapsed occupy a minimum amount of space for storage or for shipment.

Having thus described the invention, what I claim as new is:

A barrel having its body formed from a pair of flat resilient plates having their vertical edges hingedly connected, the top and lower edges of the plates being formed with beads having slits at spaced intervals, the lower bead being turned inwardly and the upper bead turned outwardly, a bottom hinged to the interior of one of the plates and adapted to be swung upon the lower beads of said plate so as to bend the plates to conform with the peripheral shape of the bottom, said bottom being so arranged as to swing within the body, a top hinged to the remaining plate and adapted to swing exteriorly of the body, and an auxiliary cover positioned directly below said top and hinged to the plate which hingedly supports said top.

In testimony whereof I affix my signature in presence of two witnesses.

WILBERT GRANT TISSUE.

Witnesses:
WM. B. COOK,
MELVILLE R. MILNE.